United States Patent
Stanciu et al.

(10) Patent No.: US 9,976,074 B2
(45) Date of Patent: May 22, 2018

(54) SELF-SUSPENDING PROPPANT PARTICULATES USING CANOLA PROTEIN-BASED HYDROGEL

(71) Applicant: Halliburton Energy Services, Inc., Houston, TX (US)

(72) Inventors: Corneliu Stanciu, Kingwood, TX (US); Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/313,237

(22) PCT Filed: Aug. 27, 2014

(86) PCT No.: PCT/US2014/052809
§ 371 (c)(1),
(2) Date: Nov. 22, 2016

(87) PCT Pub. No.: WO2016/032447
PCT Pub. Date: Mar. 3, 2016

(65) Prior Publication Data
US 2017/0183563 A1 Jun. 29, 2017

(51) Int. Cl.
*C09K 8/80* (2006.01)
*C09K 8/08* (2006.01)
(Continued)

(52) U.S. Cl.
CPC ............... *C09K 8/805* (2013.01); *C09K 8/08* (2013.01); *C09K 8/68* (2013.01); *C09K 8/685* (2013.01); *C09K 8/725* (2013.01); *E21B 43/267* (2013.01)

(58) Field of Classification Search
None
See application file for complete search history.

(56) References Cited

U.S. PATENT DOCUMENTS

2008/0108524 A1   5/2008   Willberg et al.
2013/0220608 A1*  8/2013   Rincon-Torres ......... C09K 8/70
                                                          166/285

(Continued)

FOREIGN PATENT DOCUMENTS

WO     2016032447 A1     3/2016

OTHER PUBLICATIONS

GRAS Notification for Canola Protein Isolet (Isolexx™) and Hydrolyzed Canola Protein Isolate (Vitalexx™), 2011 submission to FDA.

(Continued)

*Primary Examiner* — Angela M DiTrani
*Assistant Examiner* — Andrew Sue-Ako
(74) *Attorney, Agent, or Firm* — McDermott Will & Emery LLP

(57) ABSTRACT

Methods and compositions including self-suspending proppant particulates comprising proppant particulates at least partially coated with a canola protein-based hydrogel, wherein the canola protein-based hydrogel comprises a copolymer of a water-swellable polymeric material grafted onto a hydrolyzed canola protein backbone. In some embodiments, the water-swellable polymeric material further comprises at least one guanidinium ion pendant group.

16 Claims, 1 Drawing Sheet

(51) Int. Cl.
C09K 8/68 (2006.01)
C09K 8/72 (2006.01)
E21B 43/267 (2006.01)

(56) References Cited

U.S. PATENT DOCUMENTS

| | | |
|---|---|---|
| 2013/0233545 A1* | 9/2013 | Mahoney ............... C09K 8/80 166/280.2 |
| 2014/0014348 A1 | 1/2014 | Mahoney et al. |
| 2014/0083696 A1 | 3/2014 | Nguyen et al. |
| 2014/0162911 A1 | 6/2014 | Monastiriotis et al. |
| 2016/0251563 A1 | 9/2016 | Stanciu et al. |

OTHER PUBLICATIONS

Shi et al., Industrial Crops and Products, Processing and physical properties of canola protein isolate-based films, 2014, 52, 269-277.
Shi et al., European Polymer Journal, Synthesis and properties of Canola protein-based superabsorbent hydrogels, 2014, 54, 172-180.
Tan et al., Journal of Food Science, Canola Proteins for Human Consumption: Extraction, Profile, and Functional Properties, 2011, 76(1), R16-R28.
Wu et al., Journal of Polymer Science, High water content clay-nanocomposite hydrogels incorporating guanidinium-pendant methacrylamide: tuning the mechanical and swelling properties by supramolecular approach, 2014, 52(6), 839-847.
International Search Report and Written Opinion for PCT/US2014/052809 dated Apr. 17, 2015.

* cited by examiner

SELF-SUSPENDING PROPPANT PARTICULATES USING CANOLA PROTEIN-BASED HYDROGEL

BACKGROUND

The embodiments herein relate generally to subterranean formation operations and, more particularly, to self-suspending proppant particulates using canola protein-based hydrogel. As used herein, the term "hydrogel" refers to a gelled network of crosslinked macromolecules capable of undergoing a change in volume (i.e., swelling or shrinking) based on exposure to certain environmental conditions.

Subterranean wells (e.g., hydrocarbon producing wells, water producing wells, and the like) are often stimulated by hydraulic fracturing treatments. In hydraulic fracturing treatments, a gelled treatment fluid is often pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppant particulates" (also referred to simply as "proppants") serve to prop the fracture open (e.g., keep the fracture from fully closing) after the hydraulic pressure is removed. By keeping the fracture from fully closing, the particulates aid in forming conductive paths through which produced fluids, such as hydrocarbons, may flow.

Hydraulic fracturing treatments may also be combined with sand control treatments, such as a gravel packing treatment. Such treatments may be referred to as "frac-packing" treatments. In a typical frac-packing treatment, a gelled treatment fluid comprising a plurality of particulates (e.g. is pumped through the annulus between a wellbore tubular mounted with a screen and a wellbore in a subterranean formation. The fluid is pumped into perforations through a casing, or directly into the wellbore in the case of open hole completions at a rate and pressure sufficient to create or enhance at least one fracture, and the particulates are deposited in the fracture and in the annulus between the screen and the wellbore. The particulates aid in propping open the fracture, as well as controlling the migration of formation fines or other loose particles in the formation from being produced with produced fluids.

The degree of success of a fracturing operation (both a traditional hydraulic fracturing operation and a frac-packing operation) depends, at least in part, upon fracture porosity and conductivity once the fracturing operation is complete and production is begun. Fracturing operations may place a volume of particulates into a fracture to form a "proppant pack" or "gravel pack" (referred to herein as "proppant pack") in order to ensure that the fracture does not close completely upon removing the hydraulic pressure. In some fracturing operations, a large volume of particulates may be placed within the fracture to form a tight proppant pack. In other fracturing operations, a much reduced volume of particulates may be placed in the fracture to create larger interstitial spaces between the individual particulates. However, both fracturing approaches may result in at least some settling of the particulates within a treatment fluid as the treatment fluid is introduced downhole or after placement in a fracture opening.

Particulate settling may lead to a fracture or a top portion of a fracture closing, which may lower the conductivity of the proppant fracture and result in proppant masses having little or no interstitial spaces at the bottom portion of a fracture, thereby further decreasing the conductivity of the fracture. Proppant settling may be particularly problematic in cases where larger or heavier proppant particulates are used in place of traditional proppant particulates, which may be more difficult to hold in suspension. While settling may be counteracted by using a high pump rate or by increasing the viscosity of the fluid carrying the proppant particulates, such methods often lose effectiveness once the fluid comprising the proppant is placed into a fracture and before the hydraulic pressure is released.

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
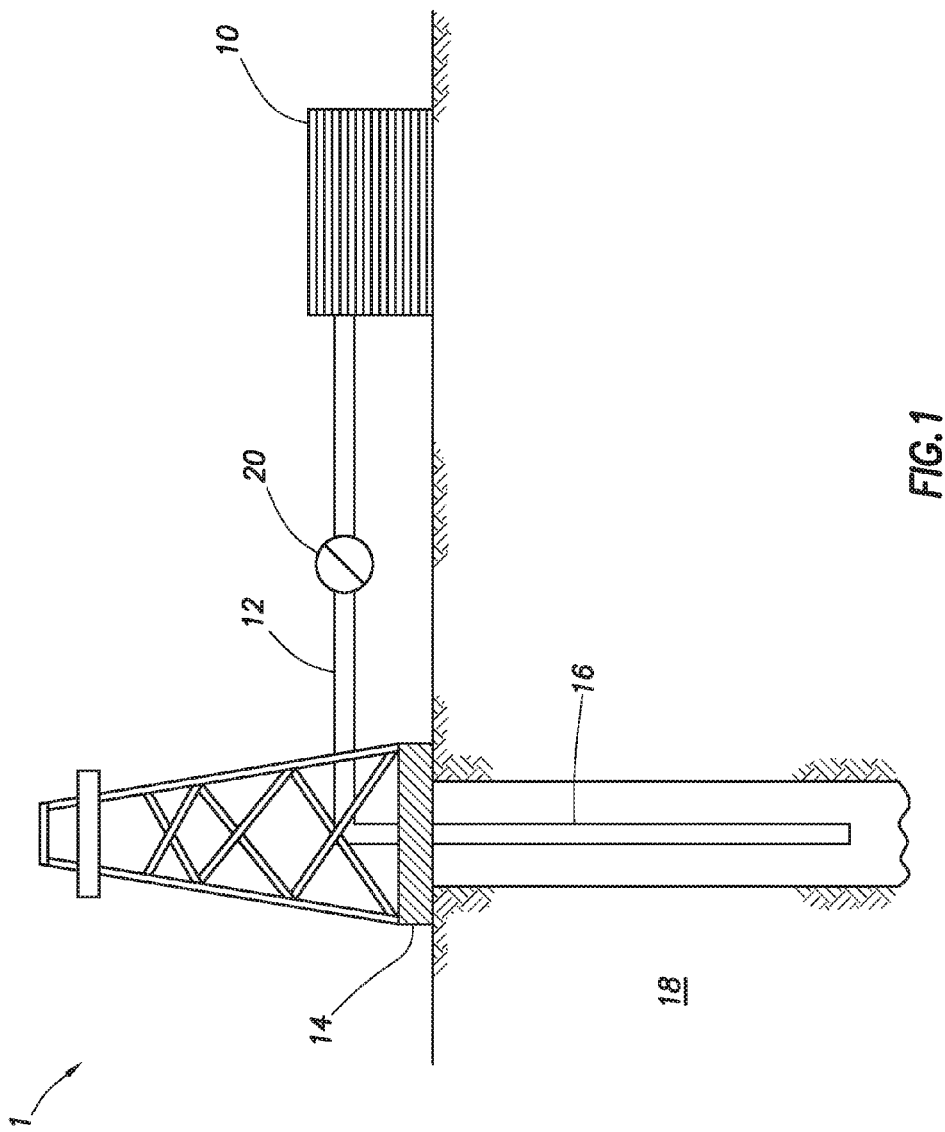
FIG. 1 depicts an embodiment of a system configured for delivering the treatment fluids comprising the self-suspending proppant particulates of the embodiments described herein to a downhole location.

The embodiments herein relate generally to subterranean formation operations and, more particularly, to self-suspending proppant particulates using canola protein-based hydrogel (CPBH). The self-suspending proppant particulates of the embodiments described herein use water-swellable polymeric material grafted onto a hydrolyzed canola protein backbone to self-suspend in a treatment fluid for use in a subterranean formation operation. The water-swellable polymeric material in the CPBH swells in the presence of water which itself enables suspension of the self-suspending proppant particulates. Additionally, the synergistic interaction between the water-swellable polymeric material and the hydrolyzed canola protein backbone forming the CPBH is capable of further absorbing water to swell by a substantially greater volume than the water-swellable polymeric material alone, thereby enhancing suspension.

The CPBH of the present disclosure may be referred to as a protein-based superabsorbent polymer hydrogel because it is able to absorb and retain a large amount of water in its polymeric gelled network. The CPBH described herein is beneficially composed of canola protein, which is derived from canola, a readily available and relatively inexpensive stable crop that is nontoxic, biocompatible, and biodegradable. Canola protein is also characterized by numerous chemical sites for modification and crosslinking, beneficially enhancing the hydrogel nature of the CPBH described herein, its swelling capacity, and its stability for use in subterranean formation operations.

In some embodiments, the methods and compositions described herein may be with reference to a hydraulic fracturing operation (e.g., formation of a proppant pack). However, the self-suspending proppant particulates may be used in any other subterranean formation operation that may employ a treatment fluid comprising a gelling agent and that may benefit from having a suspended particulate. Such subterranean formation operations may include, but are not limited to, a drilling operation; a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides self-suspending proppant particulates comprising proppant particulates at least partially coated with a CPBH, the CPBH comprising a copolymer of a water-swellable polymeric material grafted onto a hydrolyzed canola protein backbone. In some embodiments, the hydrolyzed canola protein backbone of the CPBH may further comprise at least one guanidinium ion pendant group to facilitate coating the CPBH onto the proppant particulates to form the self-suspending proppant particulates. As used herein, the term "CPBH" will encompass CPBH and CPBH with guanidinium ion pendent groups, unless specifically stated otherwise; similarly, the term "self-suspending proppant particulates" will encompass proppant particulates at least partially coated with CPBH and at least partially coated with CPBH with guanidinium ion pendent groups.

The self-suspending proppant particulates, in some embodiments, may be introduced into a subterranean formation to perform a subterranean formation operation (e.g., a fracturing operation and/or formation of a proppant pack) in a treatment fluid comprising an aqueous base fluid. Once the self-suspending proppant particulates are included in the treatment fluid, the aqueous base fluid contacts the CPBH coated thereon and causes the CPBH to swell, thereby suspending the proppant particulates in the treatment fluid.

In other embodiments, the proppant particulates and the CPBH may be each separately introduced into a treatment fluid comprising an aqueous base fluid, where the CPBH and the proppant particulates will chemically interact such that the CPBH at least partially coats onto the proppant particulates and where the aqueous fluid contacts the CPBH and causes it to swell and self-suspend the proppant particulates. In some embodiments, the separate introduction of the CPBH and the proppant particulates into a treatment fluid to form the self-suspending proppant particulates described herein may be performed on-the-fly at a well site, for example, as the treatment fluid is being placed downhole into a subterranean formation. As used herein, the term "on-the-fly" refers to performing an operation during a subterranean treatment that does not require stopping normal operations.

As previously stated, the CPBH of the present disclosure may be referred to as a protein-based superabsorbent polymer hydrogel because it is able to absorb and retain a large amount of water in its polymeric gelled network. Specifically, in some embodiments, the swelled volume of the CPBH (i.e., in the presence of an aqueous fluid) may be between a lower limit of about 30 times, 40 times, 50 times, 60 times, 70 times, 80 times, 90 times, 100 times, 110 times, 120 times, 130 times, 140 times, 150 times, and 160 times to an upper limit of about 300 times, 290 times, 280 times, 270 times, 260 times, 250 times, 240 times, 230 times, 220 times, 210 times, 200 times, 190 times, 180 times, 170 times, and 160 times, encompassing any value and subset therebetween, as compared to the unswelled volume of the CPBH (i.e., not in the presence of an aqueous fluid or having never been in the presence of an aqueous fluid). The CPBH accordingly provides significant swelling capacity allowing the proppant particulates to self-suspend in the treatment fluid without the need of an additional gelling agent or viscosifier, although the use of such gelling agents and viscosifiers are not outside the scope of the present disclosure.

The CPBH may be coated onto the proppant particulates to form the self-suspending proppant particulates described herein such as by hydrogen bonding, ionic bonding, or covalent bonding between a portion of the CPBH (e.g., the canola protein portion or the water-swellable polymeric material portion) and the surface of the proppant particulate. The type of bonding formed between the proppant particulate and the CPBH to at least partially coat the proppant particulate therewith may depend on a number of factors including, but not limited to, the type of proppant particulate selected, the type of water-swellable polymeric material forming part of the CPBH, any chemical modifications or enhancements to the CPBH, and the like.

The CPBH itself may be formed by graft polymerization forming covalent bonds between the water-swellable polymeric material and the backbone of a hydrolyzed canola protein, which may be achieved in the presence of cross-linkers and/or polymerization initiators.

Suitable water-swellable polymeric materials for use in forming the CPBH may be any water-swellable polymeric material capable of graft polymerization onto the backbone of a hydrolyzed canola protein. Examples of suitable water-swellable polymeric materials may include, but are not limited to, an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2- methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly(acrylic acid), a poly(2-hydroxyethyl methacrylate), a poly(2-hydroxypropyl methacrylate), N-isopropylacrylamide, any derivative thereof, and any combination thereof. In some embodiments, the water-swellable polymeric material may form between a lower limit of about 30%, 50% 100%, 200%, 250%, 300%, 350%, 400%, 450%, 500%, 550%, 600%, and 700% to an upper limit of about 1300%, 1250%, 1200%, 1150%, 1100%, 1050%, 1000%, 950%, 900%, 850%, 800%, 750%, and 700% by weight of the CPBH, encompassing any value and subset therebetween.

The hydrolyzed canola protein backbone forming a portion of the CPBH may generally have the formula represented by Formula I below:

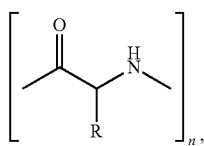

Formula I wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between a lower limit of about 500, 600, 700, 800, 900, 1000, 1100, 1200, 1300, 1400, and 1500 to an upper limit of about 2500, 2400, 2300, 2200, 2100, 2000, 1900, 1800, 1700, 1600, and 1500, encompassing any value and subset therebetween.

As previously mentioned, in some embodiments, the hydrolyzed canola protein backbone of the CPBH may further comprise at least one guanidinium ion pendant group. The guanidinium ion may be chemically bound to the R group amino acid of the hydrolyzed canola protein backbone shown in Formula I, by means known to those of skill in the art. The guanidinium ion may be used to enhance binding between the CPBH and the proppant particulates to form the self-suspending proppant particulates of the present disclosure. The presence and amount of guanidinium ions to enhance binding of the CPBH to at least partially coat the proppant particulates may depend on a number of factors including, but not limited to, the type of proppant particulate, the type of amino acid present in the canola protein backbone, the amount and strength of the desired coating (e.g., depending on the type of subterranean formation being performed), and the like. In some embodiments, the presence of guanidinium ions even in small amounts may additionally be used to tune the mechanical properties and swelling behavior of the CPBH. In some embodiments, the guanidinium ion may be present in the hydrolyzed canola protein backbone of the CPBH in the range of a lower limit of about 1, 10, 20, 30, 40, 50, 60, 70, 80, 90, 100, 110, 120, and 130 to an upper limit of about 250, 240, 230, 220, 210, 200, 190, 180, 170, 160, 150, 140, and 130, encompassing any value and subset therebetween.

In some embodiments, the water-swellable polymeric material may be grafted onto the backbone of the hydrolyzed canola protein in the presence of a crosslinker. The crosslinker may act, among other things, to stabilize the CPBH, particularly at high temperatures or in the presence of certain breakers (e.g., acid breakers). The presence of the crosslinker may additionally alter the charge density of the polymeric chains in the CPBH, thereby increasing the resistance of the CPBH to denaturation in certain environments or upon contact with certain denaturants. In some formulations, an overabundance of crosslinker may result in such an increase of polymeric linkages in the CPBH to decrease its capacity for water absorbency (i.e., the linkages cause less room to be present in the CPBH for water to absorb). Accordingly, in some embodiments, the crosslinker may be included during the graft polymerization process forming the CPBH in an amount in the range of from a lower limit of about 0.01%, 0.02%, 0.03%, 0.04%, 0.05%, 0.06%, 0.07%, 0.08%, 0.09%, and 0.1% to an upper limit of about 1%, 0.9%, 0.8%, 0.7%, 0.6%, 0.5%, 0.4%, 0.3%, 0.2%, and 0.1% by weight of the CPBH, encompassing any value and subset therebetween. Suitable crosslinkers for use in forming the CPBH of the present disclosure may include, but are not limited to, N,N'-methylenebis(acrylamide), tetraethylene glycol, ethylene glycol diacrylate, a vinyl halide, an acrylic monomer, and any combination thereof. Derivatives of these crosslinkers may also be suitable.

In some embodiments, the water-swellable polymeric material may be grafted onto the backbone of the hydrolyzed canola protein in the presence of an initiator (which in some embodiments may also be in the presence of one or more crosslinkers). The initiator may aid the graft polymerization process by, among other ways, forming more free radicals, thereby leading to higher crosslinking density and greater stability of the CPBH. The presence of the free radicals may also beneficially increase swellability of the CPBH, at least during the first several hours (e.g., between about 0 and about 6 hours) that the CPBH is in contact with an aqueous fluid. In some embodiments, the initiator may be included during the graft polymerization process forming the CPBH in an amount in the range of from a lower limit of about 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by weight of the CPBH, encompassing any value and subset therebetween. Suitable initiators for use in forming the CPBH of the present disclosure may include, but are not limited to, potassium persulfate, sodium persulfate, ammonium persulfate, sodium bisulfite, peroxodisulfate(VI) ion, azobisisobutyronitrile, benzoyl peroxide, and any combination thereof. Derivatives of these initiators may also be suitable.

The proppant particulates used to form the self-suspending proppant particulates described herein may be of any material capable of chemically bonding with the CPBH to become at least partially coated therewith. In some embodiments, the proppant particulates may be a natural or man-made material such as, for example, natural sand, silica, sodium silicate, meta-silicate, calcium silicate, aluminum silicate, ceramic, sintered bauxite, and any combination thereof. The proppant particulates may additionally be of any size and shape combination suitable for the particular subterranean formation operation in which they are being used (e.g., a fracturing operation). Generally, where the chosen proppant particulate is substantially spherical, suitable proppant particulates may have a size in the range of from a lower limit of about 2 mesh, 10 mesh, 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, and 200 mesh to an upper limit of about 400 mesh, 390 mesh, 380 mesh, 370 mesh, 360 mesh, 350 mesh, 340 mesh, 330 mesh, 320 mesh, 310 mesh, 300 mesh, 290 mesh, 280 mesh, 270 mesh, 260 mesh, 250 mesh, 240 mesh, 230 mesh, 220 mesh, 210 mesh, and 200 mesh, U.S. Sieve Series, or even higher, encompassing any value and subset therebetween. In some embodiments of the present disclosure, the proppant particulates may have a size in the range of from about 8 to about 120 mesh, U.S. Sieve Series.

In some embodiments, it may be desirable to use substantially non-spherical proppant particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, or cylinder-shaped. That is, in embodiments wherein the particulates are substantially non-spherical, the aspect ratio of the material may range such that the material is fibrous to such that it is cubic, octagonal, or any other configuration. Substantially non-spherical particulates may be generally sized such that the longest axis is from a lower limit of about 0.02 inches ("in"), 0.04 in, 0.06 in, 0.08 in, 0.1 in, 0.12 in, 0.14 in, and 0.16 in to an upper limit of about 0.3 in, 0.28 in, 0.26 in, 0.24 in, 0.22 in, 0.2 in, 0.18 in, and 0.16 in in length, and encompassing any value and any subset therebetween. In other embodiments, the longest axis is from about 0.05 inches to about 0.2 inches in length. In one embodiment, the substantially non-spherical particulates may be cylindrical, having an aspect ratio of about 1.5 to 1, a diameter of about 0.08 in, and a length of about 0.12 in. In another embodiment, the substantially non-spherical particulates may be cubic, having sides of about 0.08 inches in length.

The treatment fluids for use in transporting the self-suspending proppant particulates described may be aqueous fluids that, when in contact with the self-suspending proppant particulates, cause the CPBH to swell (e.g., by taking water into the CPBH itself). Suitable aqueous fluids may include, but are not limited to, fresh water, formation water, produced water, saltwater (e.g., water containing one or more salts dissolved therein), seawater, and any combination thereof. Generally, the aqueous fluid may be from any source, provided that it does not contain components that may adversely interfere with the self-suspending proppant particulates. The crosslinks in the CPBH may be disrupted by the presence of salts, thereby causing the CPBH to become ineffective or less effective at swelling in the presence of the aqueous fluid. Accordingly, any aqueous fluid used in forming the treatment fluids described herein should not have a salt content greater than about 0.5M, or preferably not greater than about 0.25M, or about 0.1M, or even less. In some embodiments, the self-suspending proppant particulates of the present disclosure may be present in the aqueous base fluid to form the treatment fluids described herein in an amount in the range of from a lower limit of about 0.1 lb/gal, 0.5 lb/gal, 1 lb/gal, 2 lb/gal, 3 lb/gal, 4 lb/gal, 5 lb/gal, 6 lb/gal, 7 lb/gal, 8 lb/gal, 9 lb/gal, 10 lb/gal, 11 lb/gal, 12 lb/gal, 13 lb/gal, and 14 lb/gal to an upper limit of about 25 lb/gal, 24 lb/gal, 23 lb/gal, 22 lb/gal, 21 lb/gal, 20 lb/gal, 19 lb/gal, 18 lb/gal, 17 lb/gal, 16 lb/gal, 15 lb/gal, and 14 lb/gal of the liquid phase of the treatment fluid (about 0.03 kilograms to about 12 kilograms per liquid phase), encompassing any value and subset therebetween.

In some embodiments, the treatment fluids of the present disclosure may further comprise a buffering agent used to adjust the pH of the treatment fluid comprising the self-suspending proppant particulates. The swellable properties of the CPBH may, in some cases, be tuned depending on the pH of the treatment fluid to which it is exposed. In some embodiments, the CPBH may lose its swellability character at pH ranges below about 2 and above about 12. In very acidic treatment fluids, the hydrogel chains are believed to be protonated, resulting in a diminishment of anion-anion repulsive forces and low water absorbency. In very basic treatment fluids, it is believed that an ion-induced charge screening effect occurs, interfering with the electrostatic repulsions thereby lowering water absorbency. Swelling is believed to be optimal when the treatment fluid has a low ionic strength. Suitable pH ranges for the treatment fluid may be preferably between about 3 and about 11, more preferably between about 5 and about 9, and even more preferably between about 6 and about 8. Suitable buffering agents for use in adjusting the pH of the treatment fluids described herein may include, but is not limited to, sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, sodium hydroxide, potassium hydroxide, hydrogen chloride, sulfuric acid, nitric acid, and any combination thereof.

In some embodiments, the treatment fluid may further comprise a gelling agent to further enhance suspension of the self-suspending proppant particulates described herein. A variety of gelling agents may be used in the treatment fluids of the present disclosure. Suitable gelling agents typically comprise biopolymers, synthetic polymers, or both. In some embodiments, suitable gelling agents may be biopolymers comprising polysaccharides, and derivatives thereof, including those that have one or more of the following monosaccharide units: galactose, mannose, glucoside, glucose, xylose, arabinose, fructose, glucuronic acid, or pyranosyl sulfate. Examples of suitable biopolymers can include, but are not limited to, guar, guar gum and derivatives thereof (e.g., hydroxypropyl guar and carboxymethyl-hydroxypropyl guar), cellulose and cellulose derivatives (e.g., carboxymethyl cellulose, carboxyethyl cellulose, and hydroxyethyl cellulose), and xanthan and derivatives thereof.

In some embodiments, the gelling agent, particularly a biopolymer, may be at least partially depolymerized. The term "depolymerized," as used herein, generally refers to a decrease in the molecular weight of the gelling agent molecule by removal of at least some of its monomer units.

In some embodiments, the gelling agent may comprise a synthetic polymer. In some embodiments, the gelling agent may be a synthetic polymer containing hydroxyl groups such as, for example, polyvinyl alcohol. In some embodiments, suitable monomers useful in forming a synthetic polymer useful as a gelling agent can include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethyl-aminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, and any combination thereof. In some embodiments, these monomers and others may be copolymerized with monomers that contain hydroxyl groups suitable for crosslinking with a multifunctional boronic acid functional group covalently grafted onto a proppant particulate or a crosslinker, as described below. Illustrative synthetic polymers that can include the foregoing water-soluble monomers include, but are not limited to, polyacrylates, polymethacrylates, polyacrylamides, polyvinyl alcohol, polyvinylpyrrolidone, and their copolymers.

Additional suitable synthetic polymers for use as the gelling agents in the treatment fluids described herein may include, but are not limited to, 2,2'-azobis(2,4-dimethyl valeronitrile), 2,2'-azobis(2,4-dimethyl-4-methoxy valeronitrile), acrylamide ethyltrimethyl ammonium chloride, acrylamide, an acrylamido-alkyl trialkyl ammonium salt, a methacrylamido-alkyl trialkyl ammonium salt, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, a methacryloylalkyl trialkyl ammonium salt, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly-2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, copolymers thereof, 2-(methacryloyloxy)ethyltrimethylammonium methyl sulfate, 2-(methacryloyloxy)ethyltrimethylammonium chloride, and any combination thereof.

In certain embodiments, the gelling agent may be present in a treatment fluid in an amount ranging from a lower limit of about 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the treatment fluid, encompassing any value and subset therebetween. In certain embodiments, the self-suspending proppant particulates permit a lesser amount of gelling agent to be used in a treatment fluid without compromising desired suspension properties, such as, for example ranging from a lower limit of about 5% to about 6% by weight of the treatment fluid, encompassing any value and subset therebetween.

In some embodiments, the treatment fluids comprising the self-suspending proppant particulates described herein may further comprise a breaker capable of breaking the crosslinks or bonds in the CPBH (e.g., the bonds between the water-swellable polymeric material and the hydrolyzed canola protein backbone) to disrupt it and cause it to no longer maintain swelled properties in the presence of an aqueous fluid. In some embodiments, the breaker may be delayed by encapsulation with a coating (e.g., a porous coating through which the breaker may diffuse slowly, or a degradable coating that degrades downhole) that delays the release of the breaker. In other embodiments the breaker may be a degradable material (e.g. polylactic acid or polygylcolic acid) that releases an acid or alcohol in the present of an aqueous liquid. Suitable breakers for use in the treatment fluids described herein may include, but are not limited to, an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

Examples of oxidative breakers may include, but are not limited to, organic peroxides, alkali metal persulfates, alkali metal chlorites, bromates, chlorates, hypochlorites, permanganates, and any combination thereof. Examples of acid breakers may include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers may include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly (amino acids), and any combination thereof.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endoglucosidase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Temperature activated breakers may activate by being heated by the subterranean zone in which they are placed, or by another external heat source. Examples of suitable temperature activated breakers may include, but are not limited to, alkaline earth metal peroxides, such as calcium peroxide and magnesium peroxide, zinc peroxide, and any combination thereof. Examples of suitable hydrolysable esters may include, but are not limited to, sorbitol, catechol, dimethyl glutarate and mixtures of dimethyl glutarate, dimethyl succinate, dimethyl adipate, and any combination thereof.

The anionic and cationic surfactant breakers may operate by disrupting the binding of the CPBH on the surface of the proppant particulates. Examples of suitable anionic surfactant breakers may include, but are not limited to, alpha olefin sulfonate, alkylether sulfates, alkyl phosphonates, alkane sulfonates, fatty acid salts, arylsulfonic acid salts, and any combination thereof. Examples of suitable cationic surfactant breakers may include, but are not limited to trimethylcocoammonium chloride, trimethyltallowammonium chloride, dimethyldicocoammonium chloride, bis(2-hydroxyethyl)tallowamine, bis(2-hydroxyethyl)erucylamine, bis(2-hydroxyethyl)coco-amine, cetylpyridinium chloride, and any combination thereof. A brine breaker may operate by denaturing the hydrolyzed canola protein in the CPBH. Suitable brine breakers may be any solution of salt in water having a molarity of at least about 0.1M and preferably higher than about 0.5M, encompassing any value and subset therebetween.

The treatment fluids of the present disclosure may, in some embodiments, further comprise an additive selected from the group consisting of a weighting agent, an inert solid, a fluid loss control agent, an emulsifier, a dispersion aid, a corrosion inhibitor, an emulsion thinner, an emulsion thickener, a viscosifying agent, a particulate, a lost circulation material, a foaming agent, a gas, a biocide, a bactericide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids comprising the self-suspending proppant particulates described herein to a downhole location are described. In various embodiments, the systems can comprise a pump fluidly coupled to a tubular, the tubular containing the treatment fluids described herein. It will be appreciated that while the system described below may be used for delivering treatment fluids described herein, one or more portions of the treatment fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: providing self-suspending proppant particulates, wherein the self-suspending proppant particulates comprise proppant particulates at least partially coated with a canola protein-based hydrogel (CPBH), wherein the CPBH comprises a copolymer of a water-swellable polymeric material grafted onto a hydrolyzed canola protein backbone; preparing a treatment fluid comprising an aqueous base fluid and the self-suspending proppant particulates, wherein the aqueous base fluid causes the CPBH to swell, thereby suspending the self-suspending proppant particulates therein; and introducing the treatment fluid into a subterranean formation.

Embodiment A may have one or more of the following additional elements in any combination:

Element A1: Wherein the hydrolyzed canola protein backbone comprises the formula:

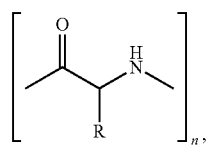

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element A2: Wherein the water-swellable polymeric material is selected from the group consisting of an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly (acrylic acid), a poly(2-hydroxyethyl methacrylate), a poly (2-hydroxypropyl methacrylate), N-isopropylacrylamide, any derivative thereof, and any combination thereof.

Element A3: Wherein the water-swellable polymeric material is grafted onto the hydrolyzed canola protein backbone in the presence of a crosslinker selected from the group consisting of N,N'-methylenebis(acrylamide), tetraethylene glycol, ethylene glycol diacrylate, a vinyl halide, an acrylic monomer, and any combination thereof.

Element A4: Wherein the water-swellable polymeric material is grafted onto the hydrolyzed canola protein backbone in the presence of an initiator selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element A5: Wherein the treatment fluid further comprises a gelling agent in the amount of about 1% to about 10% by weight of the treatment fluid.

Element A6: Wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

Element A7: Further comprising a wellhead with a tubular extending therefrom and into the subterranean formation, and a pump fluidly coupled to the tubular, wherein the treatment fluid is introduced into the subterranean formation through the tubular.

By way of non-limiting example, exemplary combinations applicable to Embodiment A include: A with A1 and A3; A with A2, A3, and A7; A with A6 and A7; A with A2 and A5; A with A3, A4, and A5; A with A2 and A6.

Embodiment B

A method comprising: providing self-suspending proppant particulates, wherein the self-suspending proppant particulates comprise proppant particulates at least partially coated with a canola protein-based hydrogel (CPBH), wherein the CPBH comprises a copolymer of a water-swellable polymeric material grafted onto a hydrolyzed canola protein backbone having a guanidinium ion pendant group; preparing a treatment fluid comprising an aqueous base fluid and the self-suspending proppant particulates, wherein the aqueous base fluid causes the CPBH to swell, thereby suspending the self-suspending proppant particulates therein; and introducing the treatment fluid into a subterranean formation.

Embodiment B may have one or more of the following additional elements in any combination:

Element B1: Wherein the hydrolyzed canola protein backbone comprises the formula:

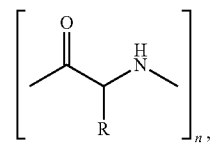

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element B2: Wherein the water-swellable polymeric material is selected from the group consisting of an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly (acrylic acid), a poly(2-hydroxyethyl methacrylate), a poly (2-hydroxypropyl methacrylate), N-isopropylacrylamide, any derivative thereof, and any combination thereof.

Element B3: Wherein the hydrolyzed canola protein backbone comprises between about 1 to about 250 guanidinium ion pendant groups.

Element B4: Wherein the water-swellable polymeric material is grafted onto the hydrolyzed canola protein backbone having a guanidinium ion pendant group in the presence of a crosslinker selected from the group consisting of N,N'-methylenebis(acrylamide), tetraethylene glycol, ethylene glycol diacrylate, a vinyl halide, an acrylic monomer, and any combination thereof.

Element B5: Wherein the water-swellable polymeric material is grafted onto the hydrolyzed canola protein backbone having a guanidinium ion pendant group in the presence of an initiator selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element B6: Wherein the treatment fluid further comprises a gelling agent in the amount of about 1% to about 10% by weight of the treatment fluid.

Element B7: Wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

Element B8: Further comprising a wellhead with a tubular extending therefrom and into the subterranean formation, and a pump fluidly coupled to the tubular, wherein the treatment fluid is introduced into the subterranean formation through the tubular.

By way of non-limiting example, exemplary combinations applicable to Embodiment B include: B with B1, B3, and B4; B with B2 and B8; B with B6, B7, and B8; B with B6 and B8; B with B1 and B2; B with B4 and B5.

Embodiment C

A self-suspending proppant particulate comprising: proppant particulates at least partially coated with a canola protein-based hydrogel (CPBH), wherein the CPBH comprises a copolymer of a water-swellable polymeric material grafted onto a hydrolyzed canola protein backbone.

Embodiment C may have one or more of the following additional elements in any combination:

Element C1: Wherein the water-swellable polymeric material further comprises at least one guanidinium ion pendant group.

Element C2: Wherein the water-swellable polymeric material further comprises between about 1 and about 250 guanidinium ion pendant groups.

Element C3: Wherein the hydrolyzed canola protein backbone comprises the formula:

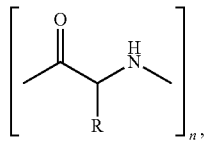

wherein the R group is an amino acid selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine, and wherein n is an integer between about 500 and about 2500.

Element C4: Wherein the water-swellable polymeric material is selected from the group consisting of an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly (acrylic acid), a poly(2-hydroxyethyl methacrylate), a poly (2-hydroxypropyl methacrylate), N-isopropylacrylamide, any derivative thereof, and any combination thereof.

Element C5: Wherein the water-swellable polymeric material is grafted onto the hydrolyzed canola protein backbone in the presence of a crosslinker selected from the group consisting of N,N'-methylenebis(acrylamide), tetraethylene glycol, ethylene glycol diacrylate, a vinyl halide, an acrylic monomer, and any combination thereof.

Element C6: Wherein the water-swellable polymeric material is grafted onto the hydrolyzed canola protein backbone in the presence of an initiator selected from the group consisting of potassium persulfate, sodium persulfate, ammonium persulfate, sodium bisulfite, peroxodisulfate(VI) ion, azobisisobutyronitrile, benzoyl peroxide, and any combination thereof.

Element C7: Wherein the treatment fluid further comprises a gelling agent in the amount of about 1% to about 10% by weight of the treatment fluid.

Element C8: Wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

By way of non-limiting example, exemplary combinations applicable to Embodiment C include: C with C3 and C6; C with C1 and C7; C with C1, C2, and C4; C with C5 and C6; C with C6, C7, and C8; C with C3 and C5.

To facilitate a better understanding of the embodiments of the present disclosure, the following examples of preferred or representative embodiments are given. In no way should the following examples be read to limit, or to define, the scope of the disclosure.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing self-suspending proppant particulates,
   wherein the self-suspending proppant particulates comprise proppant particulates at least partially coated with a canola protein-based hydrogel (CPBH),
   wherein the CPBH comprises a copolymer of a water-swellable polymeric material grafted onto a hydrolyzed canola protein backbone, wherein the hydrolyzed canola protein backbone comprises between about 1 to about 250 guanidinium ion pendant groups to enhance binding between the CPBH and the proppant particulates;
   preparing a treatment fluid comprising an aqueous base fluid and the self-suspending proppant particulates,
   wherein the aqueous base fluid causes the CPBH to swell, thereby suspending the self-suspending proppant particulates therein; and
   introducing the treatment fluid into a subterranean formation.

2. The method of claim 1, wherein the hydrolyzed canola protein backbone comprises between about 500 and about 2500 amino acid units, wherein each amino acid unit is independently
   selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine.

3. The method of claim 1, wherein the water-swellable polymeric material is selected from the group consisting of an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly(acrylic acid), a poly(2-hydroxyethyl methacrylate), a poly(2-hydroxypropyl methacrylate), N-isopropylacrylamide, any derivative thereof, and any combination thereof.

4. The method of claim 1, wherein the water-swellable polymeric material is grafted onto the hydrolyzed canola protein backbone having a guanidinium ion pendant group in the presence of a crosslinker selected from the group consisting of N,N'-methylenebis(acrylamide), tetraethylene glycol, ethylene glycol diacrylate, a vinyl halide, an acrylic monomer, and any combination thereof.

5. The method of claim 1, wherein the water-swellable polymeric material is grafted onto the hydrolyzed canola protein backbone having a guanidinium ion pendant group in the presence of an initiator selected from the group consisting of potassium persulfate, sodium persulfate, ammonium persulfate, sodium bisulfite, peroxodisulfate(VI) ion, azobisisobutyronitrile, benzoyl peroxide, and any combination thereof.

6. The method of claim 1, wherein the treatment fluid further comprises a gelling agent in the amount of about 1% to about 10% by weight of the treatment fluid.

7. The method of claim 1, wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

8. The method of claim 1, further comprising a wellhead with a tubular extending therefrom and into the subterranean formation, and a pump fluidly coupled to the tubular,
   wherein the treatment fluid is introduced into the subterranean formation through the tubular.

9. A method comprising:
   providing self-suspending proppant particulates,
   wherein the self-suspending proppant particulates comprise proppant particulates at least partially coated with a canola protein-based hydrogel (CPBH),
   wherein the CPBH comprises a copolymer of a water-swellable polymeric material grafted onto a hydrolyzed canola protein backbone, wherein the hydrolyzed canola protein backbone comprises between about 1 to about 250 arginine residues to enhance binding between the CPBH and the proppant particulates;
   preparing a treatment fluid comprising an aqueous base fluid and the self-suspending proppant particulates,
   wherein the aqueous base fluid causes the CPBH to swell, thereby suspending the self-suspending proppant particulates therein; and
   introducing the treatment fluid into a subterranean formation.

10. The method of claim 9, wherein the hydrolyzed canola protein backbone comprises between about 500 and about 2500 amino acid units, wherein each amino acid unit is independently selected from the group consisting of alanine, arginine, aspartic acid, cysteine, glutamic acid, glycine, histidine, isoleucine, leucine, lysine, methionine, phenylalanine, proline, serine, threonine, tryptophan, tyrosine, and valine.

11. The method of claim 9, wherein the water-swellable polymeric material is selected from the group consisting of an acrylamide, a polyacrylamide, a methacrylic acid, a polymethacrylamide, an acrylamide copolymer, a methacrylamide copolymer, an acrylamide-co-t-butylacrylate copolymer, a 2-acrylamido-2-methylpropane sulfonic acid/acrylamide copolymer, a sulfonated styrene/maleic anhydride copolymer, a vinylpyrrolidone/2-acrylamido-2-methylpropane sulfonic acid/acrylamide terpolymer, a 2-acrylamido-2-methylpropane sulfonic acid/N—N-dimethylacrylamide/acrylamide terpolymer, a polyacrylate, a poly(hydroxyalkyl methacrylate), a poly(N-vinyl-2-pyrrolidone), a poly(acrylic acid-co-acrylamide), a graft-poly(ethylene oxide) of poly(acrylic acid), a poly(2-hydroxyethyl methacrylate), a poly(2-hydroxypropyl methacrylate), N-isopropylacrylamide, any derivative thereof, and any combination thereof.

12. The method of claim 9, wherein the water-swellable polymeric material is grafted onto the hydrolyzed canola protein backbone in the presence of a crosslinker selected from the group consisting of N,N'-methylenebis(acrylamide), tetraethylene glycol, ethylene glycol diacrylate, a vinyl halide, an acrylic monomer, and any combination thereof.

13. The method of claim 9, wherein the water-swellable polymeric material is grafted onto the hydrolyzed canola protein backbone in the presence of an initiator selected from the group consisting of potassium persulfate, sodium persulfate, ammonium persulfate, sodium bisulfite, peroxodisulfate(VI) ion, azobisisobutyronitrile, benzoyl peroxide, and any combination thereof.

14. The method of claim 9, wherein the treatment fluid further comprises a gelling agent in the amount of about 1% to about 10% by weight of the treatment fluid.

15. The method of claim 9, wherein the treatment fluid further comprises a breaker selected from the group consisting of an oxidative breaker, an acid breaker, a delayed release acid breaker, a delayed release enzyme breaker, a temperature activated breaker, a hydrolysable ester breaker, an anionic surfactant breaker, a cationic surfactant breaker, a brine breaker, any encapsulated in an encapsulating material, and any combination thereof.

16. The method of claim 9, further comprising a wellhead with a tubular extending therefrom and into the subterranean formation, and a pump fluidly coupled to the tubular,
wherein the treatment fluid is introduced into the subterranean formation through the tubular.

\* \* \* \* \*